United States Patent [19]

McConnell et al.

[11] 4,381,948

[45] May 3, 1983

[54] ANHYDROUS KAOLIN CLAY PIGMENT AND METHOD OF PREPARATION

[75] Inventors: Anthony D. McConnell; Robert H. Garner, both of Sandersville, Ga.

[73] Assignee: Anglo-American Clays Corporation, Sandersville, Ga.

[21] Appl. No.: 256,583

[22] Filed: Apr. 22, 1981

Related U.S. Application Data

[63] Continuation of Ser. No. 61,008, Jul. 26, 1979, abandoned.

[51] Int. Cl.³ .......................... C09C 1/42; C08H 17/06
[52] U.S. Cl. .................................. 106/288 B; 501/145
[58] Field of Search ................... 106/288 B; 423/111, 423/327, 328; 501/141, 145

[56] References Cited

U.S. PATENT DOCUMENTS

| | | | |
|---|---|---|---|
| 3,014,836 | 12/1961 | Proctor | 106/288 B |
| 3,171,718 | 3/1965 | Gunn et al. | 106/288 B |
| 3,519,453 | 7/1970 | Morris et al. | 106/288 B |
| 3,586,523 | 6/1971 | Fanselow et al. | 106/288 B |
| 3,798,044 | 3/1974 | Whitley et al. | 106/288 B |

*Primary Examiner*—Edward J. Meros
*Attorney, Agent, or Firm*—Weingram & Klauber

[57] ABSTRACT

An anhydrous white kaolin clay pigment is disclosed, which consists of porous aggregates of kaolin clay platelets. The pigment exhibits exceptionally high light-scattering ability when incorporated as a filler in paper. The aggregates have an average specific gravity in the range of 0.5 to 0.6, and a size distribution such that not more than 5% by weight thereof are of greater than 10 microns ESD, at least 75% are of less than 2 microns ESD, and not more than 15% are of less than 1 micron ESD. The pigment has a Valley abrasion value below 30 mg, and preferably below 20 mg, and a GE brightness of at least 93. The mean size of the internal pores in the aggregates is less than 0.55 microns and preferably is less than 0.5 microns. This low mean pore size is deemed instrumental in producing the aforementioned high scattering ability. A method for producing the said pigment is also disclosed and claimed.

8 Claims, 1 Drawing Figure

1μ  MAGNIFICATION 4,400X

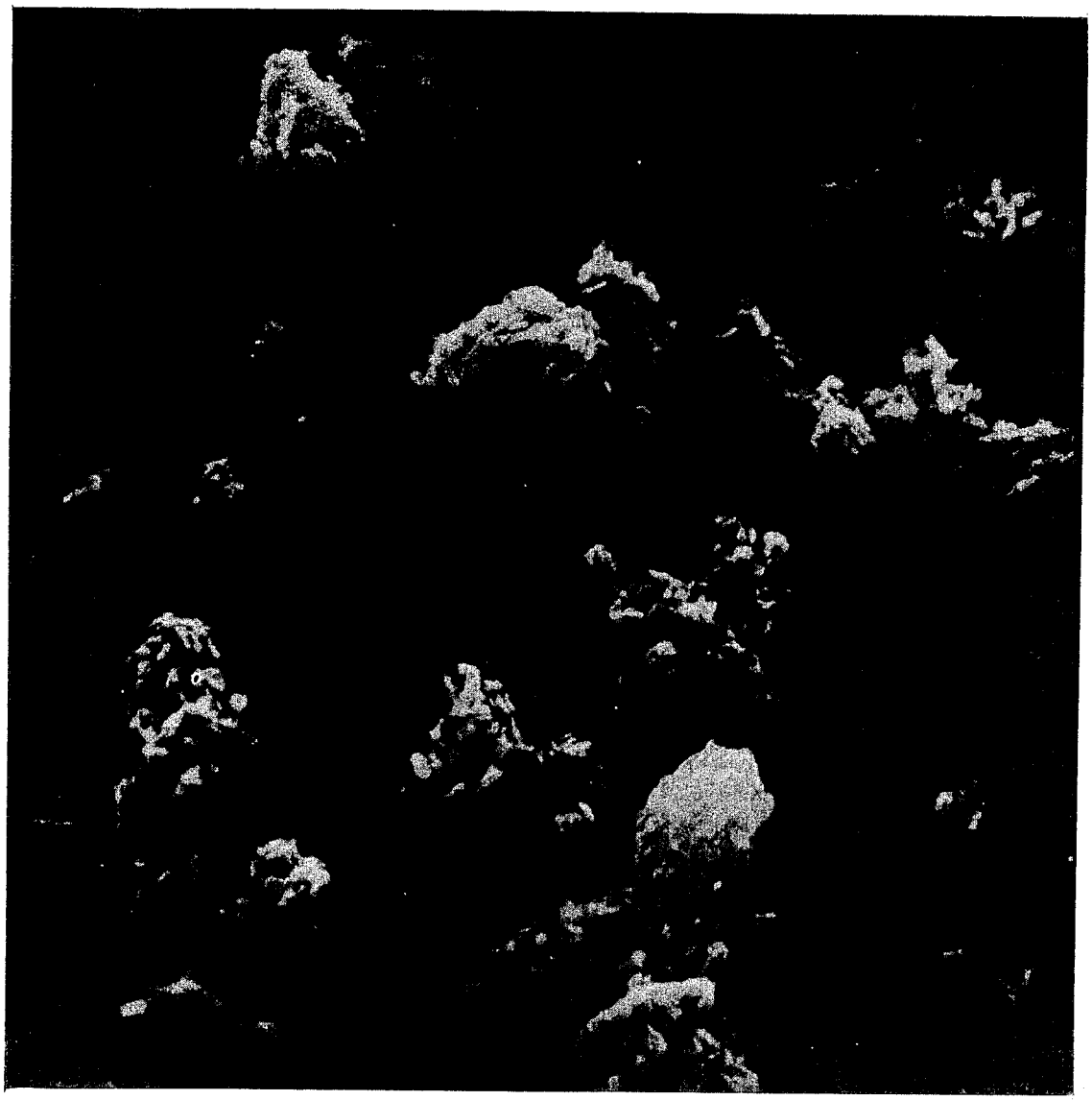
1μ MAGNIFICATION 4,400X

ANHYDROUS KAOLIN CLAY PIGMENT AND METHOD OF PREPARATION

This is a continuation of application Ser. No. 61,008 filed July 26, 1979, now abandoned.

BACKGROUND OF INVENTION

This invention relates generally to calcined clay products, and more specifically relates to an anhydrous white kaolin clay pigment and method of manufacture of same. The pigment is particularly useful as a filler in paper products, but also finds use in other applications, such as in coating of papers.

In the course of manufacturing paper and similar products, including paperboard and the like, it is well-known to incorporate quantities of inorganic materials into the fibrous web in order to improve the quality of the resulting product. In the absence of such "fillers", the resultant paper can have a relatively poor texture due to discontinuities in the fibrous web. The said fillers are also important in improving the printing qualities of the paper, i.e. by improving the surface characteristics of same. The use of appropriate such fillers further, vastly improves the opacity and the brightness of a paper sheet of a given weight.

A number of inorganic materials have long been known to be effective for many of the aforementioned purposes. Among the best of these materials is titanium dioxide, which can be incorporated into the paper in the form of anatase or of rutile. Titanium dioxide, however, is among the most expensive materials which are so usable. Thus, despite the effectiveness of such material as a filler, its use is limited, and satisfactory replacements have been much sought after.

Among the materials which have thus found increasing acceptance as paper fillers are calcined kaolin clays. Materials of this type are generally prepared by calcining a crude kaolin clay, which may have been initially subjected to prior beneficiation steps in order to remove certain impurities, e.g. for the purpose of improving brightness in the ultimate product. Reference may be usefully had to Proctor, U.S. Pat. No. 3,014,836, and to Fanselow, U.S. Pat. No. 3,586,523, which disclosures are representative of the prior art pertinent to the present invention.

Those properties which render a calcined clay pigment particularly valuable for use as a filler are also well-known. These include a low abrasion value, and high brightness and opacifying characteristics. The low abrasion is significant in order to assure that the resultant paper product may be manufactured and processed using conventional machinery without damaging same. The brightness and opacifying characteristics are important in producing an acceptable paper sheet, one which incorporates whiteness, high opacity, good printability and light weight.

Both the brightness characteristics of a given kaolin clay and the opacifying properties of same, when incorporated as a filler in paper, may be quantitatively related to a property of the filler identified as the "scattering coefficient S". The said parameter, i.e. the scattering coefficient S of a given filler pigment, is a property well-known and extensively utilized in the paper technology art, and has been the subject of numerous technical papers and the like. The early exposition of such measurements was made by Kubelka and Munk, and is reported in *Z. Tech. Physik* 12:539 (1931). Further citations to the applicable measurement techniques and detailed definitions of the said scattering coefficient, are set forth at numerous places in the patent and technical literature. Reference may usefully be had in this connection e.g., to U.S. Pat. Nos. 4,026,726, and 4,028,173. In addition to the citations set forth in these patents, reference may further be had to *Pulp and Paper Science Technology* Vol. II "Paper," Chapter 3, by H. C. Schwalbe (McGraw-Hill Book Company, N.Y.).

SUMMARY OF INVENTION

Now in accordance with the present invention, an anhydrous white kaolin clay pigment has been discovered, which is of unusual efficacy as a filler in paper sheets and similar paper products, the pigment also having application as a coating pigment for paper and the like.

The anhydrous white kaolin clay pigment of the invention consists of porous aggregates of kaolin clay platelets, and exhibits exceptionally high light-scattering ability when incorporated as a filler in paper. The aggregates have an average specific gravity in the range of 0.5 to 0.6 and a size distribution such that not more than 5% by weight of the aggregates are of greater than 10 microns equivalent spherical diameter (ESD), at least 75% by weight are of less than 2 microns ESD, and not more than 15% by weight are of less than 1 micron ESD. The pigment of the invention exhibits a Valley abrasion value below 30 mg, and preferably below 20 mg, and a GE brightness of at least 93. When incorporated as a filler in paper, the pigment displays an exceptionally high pigment scattering coefficient.

The said pigment possesses a substantially different size distribution than heretofore reported for calcined clay pigments. The characteristic, high light-scattering porous aggregates which compose the said pigment, are believed to be instrumental in producing very high light-scattering, by virtue of their high porosity, which porosity is in turn defined by very large numbers of relatively uniform voids. The mean pore size of the aggregate is less than 0.55 microns, and preferably is less than 0.5 microns. Typically, the mean pore size is thus very close to the wavelength of the light which is utilized (0.457 microns) in making the reflectance measurements from which the scattering coefficient is calculated. The cited high pigment scattering coefficient very substantially exceeds scattering coefficients heretofore achieved in prior art calcined clay pigments—as will become apparent hereinbelow.

In a preferred method for producing the anhydrous high brightness pigments of the invention, a crude kaolin clay is blunged and dispersed to form an aqueous dispersion of same. The said crude preferably includes not more than 0.5% in total by weight of glass-forming metal oxides, such as potassium, sodium, magnesium, and calcium oxides, and not more than 1.5% by weight of iron, expressed as $Fe_2O_3$, nor more than 2% by weight of titanium, expressed as $TiO_2$.

The blunged and dispersed aqueous slurry is subjected to a particle size separation, from which there is recovered a slurry of the clay wherein substantially all particles are smaller than 1 micron ESD. It has been found that particle size classification to this extent is of fundamental importance in producing the high light-scattering properties of the resultant pigment. This slurry is then dried to produce a moisture-free clay.

The dried clay is then thoroughly pulverized to break up agglomerates. The objective of this operation is to substantially liberate the individual clay platelets, as it is essential that the clay is fed to the calciner in this condition in order to form aggregates of controlled size with the desired characteristics. The pulverized product is then calcined by heating to a temperature of at least 900° C., and under conditions such that substantially none of the clay is heated to a temperature in excess of 1100° C. Thereupon the product of the calcination step is cooled and pulverized to provide a pigment of the porous high light-scattering aggregates of kaolin clay platelets as above-described.

In practicing the method of the invention, the calcining operation is preferably conducted in an indirectly-fired furnace, which may be of the Herreshoff or of other design known in the art. The indirect firing assures that the flames of the furnace do not directly impinge upon any of the clay, thereby assuring that none of the said clay is heated beyond the aforementioned 1100° C. temperature—which excessive heating can effect conversion of the clay to undesired forms. These forms, such as mullite, are highly abrasive, have low porosity, and poor light scattering ability.

The initial blunging and dispersing step is preferably conducted in the presence of dispersing agents which are substantially volatilized during the subsequent steps of the process. In this manner it is assured that even where the dispersing agents include quantities of metal ions capable of yielding gloss-forming metal compounds, the quantities of such ions ultimately remaining during the calcination step, are below those which would adversely affect formation of the final calcined clay product.

If significant quantities of fluxing or glass-forming compounds are present, it is found that on calcination of the kaolin, a vitrified abrasive material of low porosity is formed. This type of material has very poor light-scattering power, in addition to possessing other undesirable properties.

The crude kaolin, forming the source material utilized in preparing the product of the invention, may be derived from numerous types of deposits of crude kaolins. The principal limitations on the choice of the kaolin crude, are that same shall be sufficiently free of the aforementioned glass-forming oxides, and of titania and ferruginous impurities. Further, the particular crude selected as an initial starting material, should include sufficient quantities of particles smaller than 1 micron ESD, to enable recovery of worthwhile fractions during the above-described particle size separation step of the method used pursuant to the invention.

The crude may thus comprise one including a high percentage, e.g. 80% or more by weight, of particles less than 2 microns ESD, and having an index of crystallinity less than 0.5. This latter type of clay includes many of the so called "hard" kaolins found in parts of the Southeastern United States, including Georgia, South Carolina and elsewhere; and also includes similar clays of this type found in other deposits, such as e.g. in the Charente district of France.

The said crude can also be a soft cream, Georgia kaolin, of the type which is very common in numerous parts of Georgia. These clays are characterized, among other factors, by a moderate percentage, e.g. 50–60% by weight of particles less than 2 microns ESD and an index of crystallinity of about 1. (The method for determining crystallinity values is described in Bates, T. F., and Hinckley, D. N. (1959) *Mineralogy and Petrology of the Kaolin Clays of the Piedmont and Coastal Plain Regions of Southeastern United States: Progress Report,* June 1, 1958–June 1, 1959, The Pennsylvania State University, University Park, Pa.)

DESCRIPTION OF DRAWINGS

The single FIGURE herein is an electron photomicrograph of an anhydrous white kaolin clay pigment in accordance with the present invention.

DESCRIPTION OF PREFERRED EMBODIMENT

Practice of the present invention will now be illustrated by Examples which are deemed illustrative of both the process taught by the present invention, and of the products yielded in accordance with the invention:

EXAMPLE I

The process of the present invention was practiced in accordance with this Example, starting with an initial kaolin crude deriving from a deposit located near Oconee, Ga. This crude was of the type sometimes identified as a "hard" kaolin. The term "hard" while often used in reference to a clay deposit of the type used in this Example, is not deemed to be a particularly accurate or precisely defined term. The source of the said term is indeed from the rubber industry wherein clay fillers are identified as "hard" or "soft" depending upon their effects when employed in the rubber environment. In any event, the particular crude used in this Example is more precisely characterized by the presence therein of over 80% by weight of particles less than 2 microns ESD, and by a crystallinity index well below 0.5. The actual crystallinity of the clay considered in this Example was of the order of 0.28. The said crude was also characterized by the following approximate chemical analysis, where the analysis was effected using a less than 5 micron ESD fraction separated from the crude and wherein components are all expressed as weight percent: $SiO_2$—45%; $Al_2O_3$—37%; $Fe_2O_3$—0.93%; $TiO_2$—1.6%; $CaO$—0.15%; $MgO$—0.08%; $K_2O$—0.10%; $Na_2O$—0.07%; the balance of 14% consisted principally of water, together with a small amount of organic matter.

A sample of the above crude was blunged and dispersed in water to form an aqueous dispersion at 60% solids. The dispersing agents utilized were Dispex N-40 at a concentration of 3.5 lb/ton with the pH being adjusted to 9.5 with ammonium hyrdoxide. "Dispex" is a trademark of Allied Colloids of Great Britain, for a water soluble salt of a polyacrylic acid or a polymethacrylic acid, preferably having an average molecular weight in the range of 500 to 10,000. The polyacrylic and/or polymethacrylic salts are typically present in this step from about 2 to 5 lbs/ton based on the weight of dry clay.

The 60% solids slurry was then diluted with water to 15% solids, degritted by passage through a 325 mesh screen, and thereupon subjected to a particle size separation by being processed in a laboratory bottle centrifuge, where the said slurry was centrifuged at 2000 rpm for a period of 8 minutes. The recovered fine fraction was found to include 100% by weight of particles the average size of which were determined by sedimentation analysis to be less than 1.0 micron ESD.

In performing the sedimentation analysis yielding the above size range, Micromeritics Sedigraph 5000 Particle Size Analyzer (Micromeritics Instrument Corp., Norcross, Ga.) was utilized, and it was assumed that the specific gravity of the particles being subjected to the analysis was 2.58. It should be appreciated in this connection that such assumption is appropriate to the sedimentation analysis at this point in the present process, in that the particular clay matter being analyzed is at this point in the form of discrete clay particles or platelets. The porous aggregates which characterize the final product of this invention, and which have a radically different specific gravity from the constituent platelets, are not formed until the calcination step.

The said fine fraction slurry from the separation was thereupon subjected to spray drying in a Niro Atomizer unit (Niro Atomizer Corp., Columbia, MD) to produce an essentially moisture-free clay material. This material was thereupon pulverized in a Microsamplmill (United States Filter Corp., Summit, N.J.) to substantially liberate the clay platelets.

The pulverized clay product from the above operation was then subjected to controlled calcination. More specifically, the said product was heated for a period of 30 minutes, and under such conditions that all portions of the clay were brought to a temperature of at least 900° C., while substantially none of the clay was heated to a temperature in excess of 1100° C. The said heating was conducted in a muffle furnace.

It is important in accordance with one aspect of the invention that the method of heating be such that no portions of the clay being heated, including surface portions of same, shall rise above a temperature of 1100° C. Should this occur, some conversion of the clay to highly crystalline (and abrasive) mullite can occur, which is undesirable for present purposes. In order to assure that such excessive heating is precluded, various types of furnaces can be utilized. For commercial purposes, e.g., indirectly-fired Herreshoff furnaces can be employed, as can indirectly-fired rotary calciners, or other furnaces as are known in the art which are based on indirect firing principles. The indirect firing aspect of the last-mentioned furnaces, assures that none of the actual flames impinge directly on the clay being heated. Were such flames to so impinge, the temperature of at least surface portions of the clay subjected to same could rise above the 1100° C. level.

The product from the calcination step, after being cooled, was then provided to a Mikrosamplmill, wherein the said material was pulverized to yield a final product. The objective of this pulverizing procedure is to break up any gross agglomerates which may have formed in the calciner, i.e. those in excess of 10 microns ESD. The pulverization does not, however, impair the structure of the fundamental discrete aggregates formed during calcination, which aggregates define the final product of the invention.

The pigment product resulting from the aforementioned sequence of operations was then examined and found to have a GE brightness of 94.3, and a Valley abrasion value of 10 (all Valley abrasion values reported herein are determined by the Institute of Paper Chemistry Procedure 65).

The said pigment product is shown in the electron photomicrograph of FIG. 1. The pigment is predominantly composed of discrete bodies, which are porous aggregates of kaolin platelets. As can be appreciated from the 1 micron scale adjacent to the photomicrograph, the size distribution is such that most of the said aggregates are over 1 micron in size.

The individual aggregates, are highly porous in nature. Actual porosity data was obtained with respect to the product of this Example, using a mercury intrusion procedure, and yielded the following results: The volume of mercury intruded per gram of pigment was 1.5 cm$^3$. The pore size distribution by volume was 100%—0.9 micron, 62%—0.5 micron, and 7%—0.2 micron. The mean pore size was 0.48 microns. The specific gravity of the mineral component of the aggregates was determined by pycnometer to be 2.72. From this data the pigment has a volume void fraction of 80.2% and a specific gravity in air of 0.535.

In conducting a sedimentation test to determine the size characteristics of the aggregate, the aforementioned porosity data establishes that the individual aggregates when thoroughly inundated with water during the sedimentation procedure, have an average specific gravity of 1.34. By this is meant that a typical aggregate, once the extensive pore system of same is filled with water, has an average density 1.34 times that of water.

It is this specific gravity figure of 1.34 which is applicable in determinations of particle size made by sedimentation procedures, and such a determination (carried out in a Sedigraph 5000) yielded the following size distribution data for the product of this Example: 98% by weight are less than 10 microns ESD, 86% by weight are less than 2 microns ESD, and 10% by weight are less than 1 micron ESD.

The size distribution data as thus determined by sedimentation, is fully confirmed by electron photomicrography, which yields direct evidence of the size characteristics of the present materials.

The pigment product yielded by this Example was subjected to tests to determine the pigment scattering coefficient of the pigment when same was used as a filler in paper at a 10% loading factor by weight. More specifically the pigment was tested at 10% loading in Storafite (trademark of Nova Scotia Forest Industries) bleached sulphite pulp beaten to a CSF (Canadian Standard Freeness) of 300–320. Deionized water was used in the sheet formation, together with alum to adjust the pH to 4.5 and Percol 140 (trademark of Allied Colloids) as a retention aid. Twelve handsheets incorporating samples of the pigment were made, of which two were ashed to determine loading and retention, and the remaining ten conditioned overnight in the laboratory for testing for optical values used to determine the scattering coefficient. The tests thus performed, showed an average pigment scattering coefficient of 5077 cm$^2$/g, an unusually high scattering coefficient, as will further become apparent hereinbelow.

EXAMPLE II

The particle size separation step utilized in the process of the present invention, has been unexpectedly found to have a startling effect upon the pigment scattering coefficient of the resultant pigment product. In the present Example this point is strikingly illustrated by application of the method generally described in Example I, above, to three samples of the same crude clay utilized in that Example. The processing steps were thus identical for all three samples A, B, and C, and are as above described, except that in the instance of sample A the separation step provided a recovered slurry wherein 100% by weight of the particles thereof were less than 0.5 microns; in the instance of sample B (corresponding to Example I) the separation step recovered a slurry wherein 100% of the particles by weight were of less than 1.0 micron ESD; and in the instance of sample C, the separation step recovered a slurry wherein 98% by weight of the particles were of less than 2 microns ESD.

These samples A, B, and C were then further processed as in Example I. The resultant pigment had properties in Table I below:

TABLE I

|  | Sample A | Sample B | Sample C |
|---|---|---|---|
| Brightness | 93.5 | 94.3 | 91.5 |
| Abrasion | 15 | 10 | 24 |
| Scattering Coefficient ($cm^2/g$) | 5740 | 5077 | 4479 |

The porosity and particle size distribution data for these samples were determined and appear in Table II below:

TABLE II

|  | Sample A | Sample B | Sample C |
|---|---|---|---|
| Volume of mercury/gram of pigment | 1.6 | 1.5 | 1.59 |
| Mean pore size (microns) | 0.43 | 0.48 | 0.64 |
| S.G. in air | 0.51 | 0.535 | 0.51 |
| S.G. in water | 1.32 | 1.34 | 1.32 |
| P.S.D. (Particle Size Distribution) |  |  |  |
| −10u | 95 | 98 | 99 |
| −5u | 85 | 96 | 98 |
| −2u | 75 | 86 | 70 |
| −1u | 11 | 10 | 1 |

In comparing the scattering coefficients of Samples A and C, it will be seen that an increase in scattering coefficient has resulted of the order of 28%. In the context of the art to which the present invention appertains, i.e. to the augmentation of filler properties for application to paper loading, this increase is a striking and completely unexpected result.

The reason for the vast increase in scattering coefficient which appears to flow from the separation step, is not completely understood. It is hypothesized, however, that the porous aggregates of the present invention have unusually effective light scattering properties because such aggregates are formed from sub-micron sized platelets. The resultant aggregrate thus includes, in relation to its total volume, very large numbers of relatively uniformly-sized pores. The mean pore size, as already indicated, is less than 0.55 microns, and is preferably less than 0.5 microns. These pores indeed typically have dimensions (See Table I) close to the wavelength of the light customarily used for paper reflectance measurements (0.457 microns), and appear to constitute unusually effective refracting and diffusely reflecting sites for light rays incident upon the aggregates.

A further startling fact becomes apparent upon comparison of samples B and C. In particular, a clay classified to 98%—2 microns (sample C) is generally in consequence well in excess of 90%—1 micron (generally about 95%—1 micron). Therefore, classification beyond 98%—2 microns to 100%—1 micron (sample B) does not represent a tremendous change in less than 1 micron content, i.e. only from 95% to 100%. The fact that this relatively small change has such a dramatic effect on pore size and on pigment scattering coefficient is deemed completely unexpected.

EXAMPLE III

In this Example a product in accordance with the present invention was compared with both anhydrous and hydrous commercially available clay fillers. In particular, a further sample was prepared by the same procedure as is described for Sample B in Example II, except that in the size classification step the clay slurry was cut to 100%—1 micron by gravity sedimentation rather than by centrifuge. The pigment brightness and abrasions were measured, and the materials were evaluated in handsheets at 10% loading as described in Example I. The results are set forth in Table III below:

TABLE III

| Product | Pigment Brightness (G.E.) | Valley Abrasion | Pigment Scattering Coefficient ($cm^2/g$) |
|---|---|---|---|
| Ansilex 93* | 93.1 | 26 | 4346 |
| Nuopaque** | 90.5 | 19 | 4750 |
| Betacote*** | 90.5 | 10 | 3104 |
| Product of Invention | 93.1 | 17 | 5428 |

*Anhydrous kaolin clay product available from Engelhard Minerals & Chemical Corp., Menlo Park, Edison, NJ.
**Anhydrous kaolin clay product available from Freeport Kaolin Co., New York, NY.
***A high bright 80% −2 microns hydrous kaolin clay product which is used extensively as a high brightness filler, and which is available from Anglo-American Clays Corp., Atlanta, GA.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. An anhydrous white kaolin clay pigment having high light scattering when incorporated as a filler in paper, said pigment consisting of porous aggregates formed from sub-micron sized kaolin clay platelets obtained by classification of a dispersed kaolin clay to a 100% less than one micron ESD fraction, said aggregates having an average specific gravity in the range of 0.5 to 0.6 and a mean internal pore size of less than 0.55 microns; the size distribution of said aggregates being such that not more than 5% by weight thereof are greater than 10 microns ESD, at least 75% are of less than 2 microns ESD, and not more than 15% by weight are of less than 1 micron ESD; said pigment having a Valley abrasion value below 30 mg, and a GE brightness of at least 93.

2. An anhydrous pigment in accordance with claim 1 having a Valley abrasion value below 20 mg.

3. An anhydrous pigment in accordance with claim 2, wherein the mean pore size of said aggregates is less than 0.5 microns.

4. A method for producing an anhydrous high-brightness white kaolin clay pigment having enhanced light-scattering properties when incorporated as a filler in paper; said method comprising:

blunging and dispersing a crude kaolin clay, to form an aqueous dispersion of same; said crude clay including a total of not more than 0.5% by weight of glass-forming metal oxides, and not more than 1.5% by weight of iron, expressed as $Fe_2O_3$, nor more than 2% by weight of titanium, expressed as $TiO_2$;

subjecting said aqueous clay dispersion to a particle size separation, and recovering from said separation a slurry of said clay, wherein 100% by weight of the particles are of less than 1 micron ESD;

drying said slurry to produce a moisture-free clay;

milling said clay to break up agglomerates;

calcining the milled clay product by heating same to a temperature of at least 900° C., and under conditions such that substantially none of said clay is heated to a temperature in excess of 1100° C.; and cooling the product of said calcination step and milling same to provide a pigment consisting of porous high light-scattering aggregates of kaolin clay platelets, said aggregates having an average specific gravity in the range of 0.5 to 0.6 and a mean internal pore size of less than 0.55 microns; the size distribution of said aggregates being such that not more than 5% by weight thereof are greater than 10 microns ESD, at least 75% are of less than 2 microns ESD, and not more than 15% by weight are of less than 1 micron ESD; said pigment having a Valley abrasion value below 30 mg, and a GE brightness of at least 93.

5. A method in accordance with claim 4, wherein said calcining is conducted in an indirectly fired furnace.

6. A method in accordance with claim 4, wherein said initial blunging and dispersing is conducted in the presence of dispersing agents, which are substantially volatilized during the subsequent steps of said process.

7. A method in accordance with claim 4, wherein said crude kaolin includes more than 80% by weight of particles less than 2 microns ESD, and wherein the index of crystallinity of said crude is less than 0.5.

8. A method in accordance with claim 4, wherein said size classification is effected by centrifuging.

* * * * *